US012609088B1

(12) United States Patent
Hashimoto

(10) Patent No.: US 12,609,088 B1
(45) Date of Patent: Apr. 21, 2026

(54) ELECTRONIC DEVICE

(71) Applicant: Innolux Corporation, Miaoli County (TW)

(72) Inventor: Kazuyuki Hashimoto, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/023,331

(22) Filed: Jan. 16, 2025

(51) Int. Cl.
*G09G 3/3233* (2016.01)
*G09G 3/3266* (2016.01)
*G09G 3/3291* (2016.01)

(52) U.S. Cl.
CPC ......... *G09G 3/3291* (2013.01); *G09G 3/3266* (2013.01); *G09G 2300/0426* (2013.01); *G09G 2300/043* (2013.01); *G09G 2300/0842* (2013.01)

(58) Field of Classification Search
CPC .................................................... G09G 3/3233
See application file for complete search history.

(56) References Cited

U.S. PATENT DOCUMENTS 9,978,728 B2 5/2018 Lin et al.
10,084,147 B2 9/2018 Liu et al.
10,304,813 B2 5/2019 Kuo et al.
10,886,260 B2 1/2021 Kuo
11,263,976 B2 * 3/2022 Yang .................... G09G 3/3233
11,342,319 B2 5/2022 Lin et al.
11,515,271 B2 11/2022 Hosaka
11,537,015 B2 12/2022 Kuo
11,658,262 B1 5/2023 Cheng et al.
11,658,276 B2 5/2023 Huang et al.
11,699,690 B2 7/2023 Shih et al.
11,961,474 B2 * 4/2024 Yang .................... G09G 3/3266
12,272,298 B2 * 4/2025 Park ...................... G09G 3/3233
12,347,382 B2 * 7/2025 Yang ..................... H10D 86/481
2006/0139253 A1 * 6/2006 Choi ..................... G09G 3/3233 345/76
2007/0124633 A1 * 5/2007 Kim ...................... G09G 3/3266 714/726
2009/0167743 A1 * 7/2009 Goh ...................... G09G 3/3233 345/76

(Continued)

FOREIGN PATENT DOCUMENTS

CN 116805468 9/2023

*Primary Examiner* — Sepehr Azari
(74) *Attorney, Agent, or Firm* — JCIPRNET

(57) ABSTRACT

An electronic device is proposed. The electronic device includes a first transistor, a second transistor, a third transistor, a fourth transistor, a first capacitor, a second capacitor, and a tunable component. The second transistor is coupled to the control terminal of the first transistor. The first capacitor is coupled between the first terminal of the first transistor and the second transistor. The second capacitor is coupled between the control terminal of the first transistor and the second transistor. The first capacitor and the second capacitor are connected in series between the first terminal and the control terminal of the first transistor. The third transistor is coupled to a first node between the second capacitor and the control terminal of the first transistor, and configured to receive a first voltage. The fourth transistor is coupled to a second node between the second capacitor and the second transistor.

11 Claims, 13 Drawing Sheets

1000

(56) References Cited

U.S. PATENT DOCUMENTS

| | | | | |
|---|---|---|---|---|
| 2011/0221791 | A1* | 9/2011 | Kajiyama | G09G 3/3233 345/77 |
| 2014/0192037 | A1* | 7/2014 | Chung | G09G 3/2022 345/82 |
| 2014/0292625 | A1* | 10/2014 | Lee | G09G 3/3233 345/82 |
| 2015/0348464 | A1* | 12/2015 | In | G09G 3/2022 345/82 |
| 2017/0199616 | A1* | 7/2017 | Kim | G06F 3/0412 |
| 2018/0137808 | A1* | 5/2018 | Na | G09G 3/3233 |
| 2018/0275795 | A1* | 9/2018 | Takahashi | G06F 3/0412 |
| 2019/0041701 | A1 | 2/2019 | Chen et al. | |
| 2020/0020271 | A1 | 1/2020 | Watsuda | |
| 2020/0365074 | A1* | 11/2020 | Hashimoto | G09G 3/32 |
| 2021/0027701 | A1* | 1/2021 | Park | G09G 3/3241 |
| 2021/0049965 | A1* | 2/2021 | Jeon | G09G 3/3266 |
| 2021/0065619 | A1* | 3/2021 | Kim | G09G 3/3291 |
| 2021/0065628 | A1* | 3/2021 | Kim | G09G 3/3266 |
| 2021/0248961 | A1* | 8/2021 | Yang | G09G 3/3266 |
| 2021/0287599 | A1* | 9/2021 | Kim | G09G 3/3233 |
| 2021/0375192 | A1* | 12/2021 | Jeon | G09G 3/3233 |
| 2022/0028333 | A1* | 1/2022 | Jeong | G09G 3/3275 |
| 2022/0084472 | A1* | 3/2022 | Kim | G09G 3/3266 |
| 2023/0042603 | A1* | 2/2023 | Huangfu | G09G 3/3233 |
| 2023/0122487 | A1* | 4/2023 | Yang | G09G 3/20 345/81 |
| 2023/0206841 | A1* | 6/2023 | Kim | H10K 59/121 345/204 |
| 2023/0252935 | A1* | 8/2023 | Park | G09G 3/3233 345/55 |
| 2023/0419882 | A1* | 12/2023 | Lim | G09G 3/32 |
| 2024/0005847 | A1* | 1/2024 | Yang | G09G 3/3266 |
| 2024/0013724 | A1* | 1/2024 | Lee | G09G 3/3233 |
| 2024/0078976 | A1* | 3/2024 | Cheng | G09G 3/32 |
| 2024/0161685 | A1* | 5/2024 | Park | H10K 59/131 |
| 2024/0194125 | A1* | 6/2024 | Park | G09G 3/3233 |
| 2024/0242674 | A1* | 7/2024 | Yang | H10D 86/481 |
| 2024/0404464 | A1* | 12/2024 | Yang | G09G 3/2007 |
| 2025/0209974 | A1* | 6/2025 | Yang | G09G 3/32 |
| 2025/0252906 | A1* | 8/2025 | Yang | G09G 3/32 |
| 2025/0308438 | A1* | 10/2025 | Hwang | G09G 3/3233 |
| 2025/0349242 | A1* | 11/2025 | Yang | G09G 3/32 |

* cited by examiner

ELECTRONIC DEVICE

BACKGROUND

Technical Field

The disclosure relates to a device, and particularly relates to an electronic device.

Description of Related Art

In the related art, a pixel circuit may utilize a storage capacitor coupled between a constant voltage source and a gate terminal of a driving transistor to maintain a gate voltage of the gate terminal of the driving transistor. If a voltage on a source terminal of the driving transistor is shifted by an IR-drop, the storage capacitor will disturb to maintain a gate-source voltage of driving transistor, thereby causing a driving current shift of the pixel circuit. In the related art, in order to alleviate the driving current shift (IR-drop problem), a wiring for the source terminal may be designed to be wider to reduce the resistance. However, based on the related layout limitation of the electric device, a performance will be affected.

SUMMARY

The disclosure is directed to an electronic device, particularly a display device comprising a tunable component, which is adapted to provide a better display effects.

The electronic device of the disclosure, the electronic device includes a first transistor, a second transistor, a third transistor, a fourth transistor, a first capacitor, and a second capacitor. The first transistor includes a first terminal, a second terminal, and a control terminal. The second transistor is coupled to the control terminal of the first transistor. The first capacitor is coupled between the first terminal of the first transistor and the second transistor. The second capacitor is coupled between the control terminal of the first transistor and the second transistor. The first capacitor and the second capacitor are connected in series between the first terminal and the control terminal of the first transistor. The third transistor is coupled to a first node between the second capacitor and the control terminal of the first transistor, and configured to receive a first voltage. The fourth transistor is coupled to a second node between the second capacitor and the second transistor. The tunable component is coupled to the second terminal of the first transistor. When the electronic device is operated in a first period, the first node is set to the first voltage, the second node is set to a second voltage with different voltage sources, respectively.

Based on the above description, the electronic device of the disclosure may effectively mitigate a luminance shift caused by a source voltage shift (IR-drop).

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
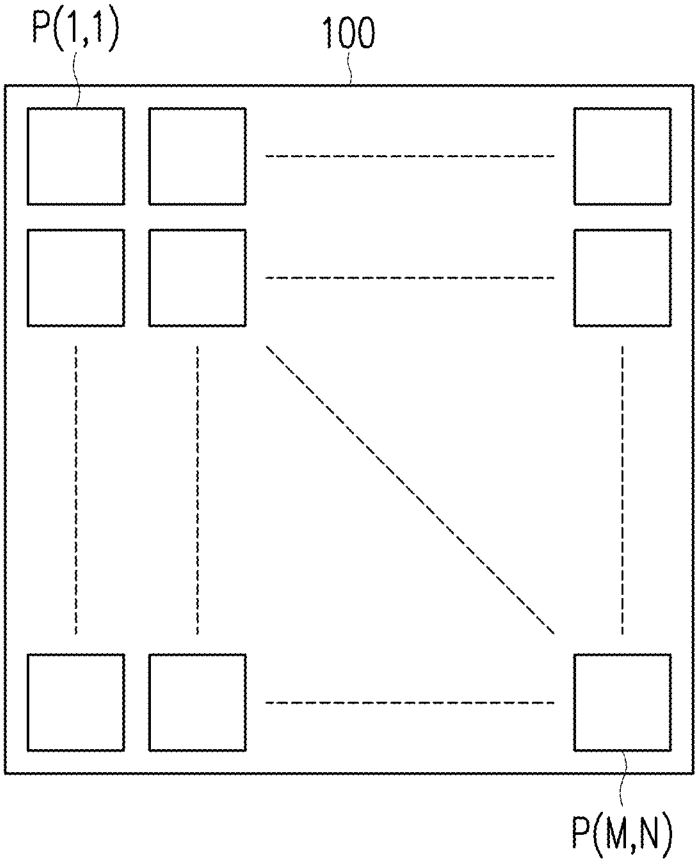
FIG. 1 is a schematic diagram of an electronic device according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

FIG. 1 is a schematic diagram of an electronic device according to an embodiment of the disclosure Referring to FIG. 1, an electronic device 100 may be a display device, and may include a plurality of pixels P(1,1) to P(M,N), where M and N are positive integers. In the embodiment of the disclosure, the pixels P(1,1) to P(M,N) form a pixel array, and may be disposed on a substrate. The substrate may be a glass substrate, but the disclosure is not limited thereto. In the embodiment of the disclosure, the electronic device 100 may further include a plurality signal lines coupled to the pixels P(1,1) to P(M,N).

In the embodiment of the disclosure, the electronic device 100 may be a light emitting diode (LED) display device, but the disclosure is not limited thereto. In one embodiment of the disclosure, the electronic device 100 may be an active-matrix light emitting diode (AM-LED) display device, but the disclosure is not limited thereto. In some embodiment of the disclosure, the electronic device 100 may, for example, be adapted to a liquid crystal, a light emitting diode, a quantum dot (QD), a fluorescence, a phosphor, other suitable display medium, or the combination of the aforementioned material, but the disclosure is not limited thereto. The light emitting diode may include, for example, organic light emitting diode (OLED), mini light emitting diode (Mini LED), micro light emitting diode (Micro LED), or quantum dot light emitting diode (QDLED) or other suitable materials. The materials may be arranged and combined arbitrarily, but the disclosure is not limited to thereto. The electronic device 100 may further include peripheral systems such as a driving system, a control system, a light source system, a shelf system, and the like to support the light emitting device.

Figure 2:
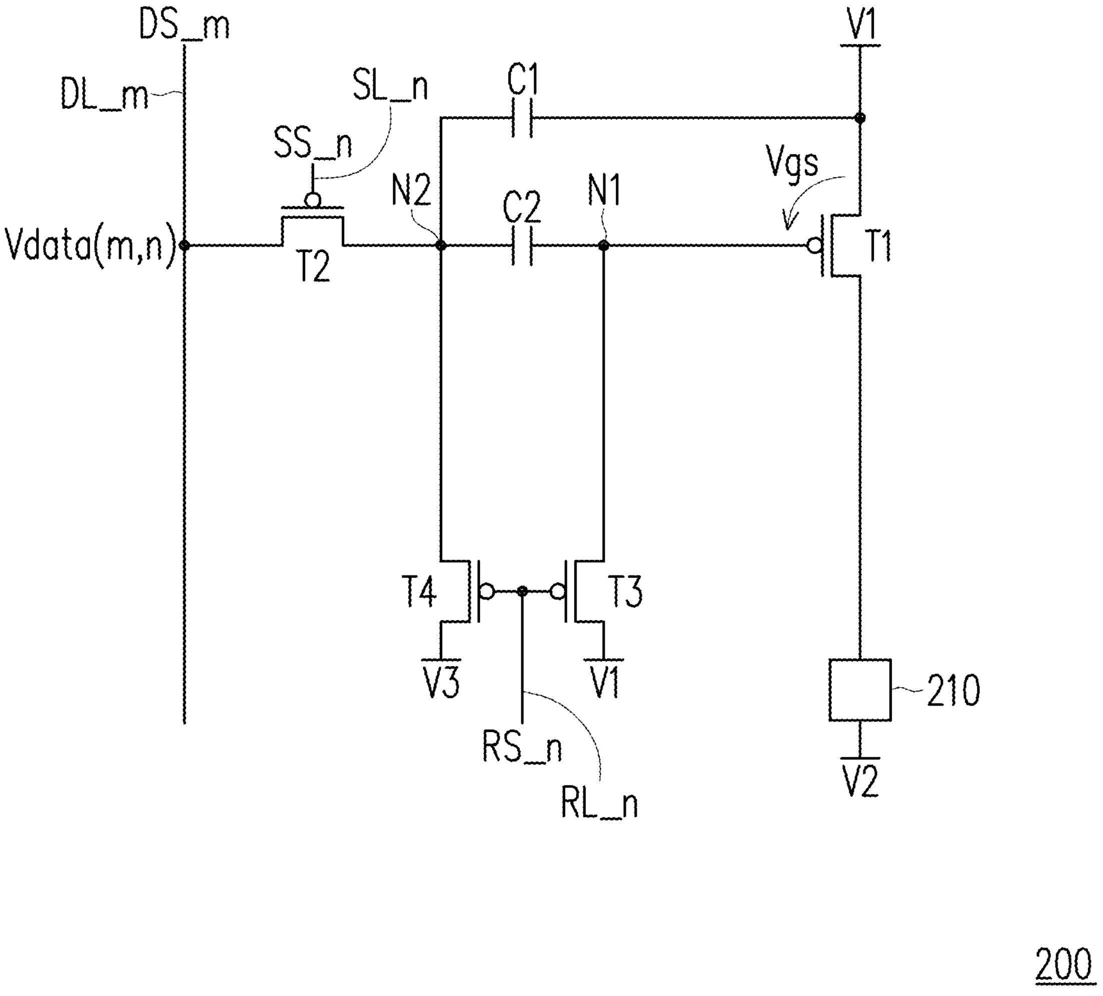
FIG. 2 is a schematic diagram of a pixel circuit according to an embodiment of the disclosure.

FIG. 2 is a schematic diagram of a pixel circuit according to an embodiment of the disclosure Referring to FIG. 2, each of the pixels P(1,1) to P(M,N) of FIG. 1 may implement a circuit architecture such as a pixel circuit 200 of FIG. 2. In the embodiment of the disclosure, the pixel circuit 200 includes a first transistor T1, a second transistor T2, a third transistor T3, a fourth transistor T4, a first capacitor C1, a second capacitor C2, and a tunable component 210. The pixel circuit 200 may further include a first power line, a second power line, a reference voltage line, a data signal line DL_m, a scan signal line SL_n, and a reset signal line RL_n, where m is a positive integer between 1 to M, and n is a positive integer between 1 to N. In the embodiment of the disclosure, the tunable component 210 may be, for example, a light emitting diode or an organic light emitting diode.

In the embodiment of the disclosure, a first terminal of the first transistor T1 is coupled to the first power line and a first terminal of the capacitor C1, and receives a voltage V1 from the first power line. A second terminal of the first transistor T1 is coupled to the tunable component 210. A control terminal of the first transistor T1 is coupled to a node N1.

A first terminal of the second transistor T2 is coupled to the data signal line DL_m, and receives a data signal DS_m from the data signal line DL_m. A second terminal of the second transistor T2 is coupled to a node N2. A control terminal of the second transistor T2 is coupled to the scan signal line SL_n, and receives a scan signal SS_n from the scan signal line SL_n.

A first terminal of the third transistor T3 is coupled to the node N1. A second terminal of the third transistor T3 is coupled to the first power line, and receives the voltage V1 from the first power line. A control terminal of the third transistor T3 is coupled to the reset signal line RL_n, and receives a reset signal RS_n from the reset signal line RL_n.

A first terminal of the fourth transistor T4 is coupled to node N2. A second terminal of the fourth transistor T4 is coupled to the reference voltage line, and receives a voltage V3 from the reference voltage line. The reference voltage line is dedicated and electrically isolated from the first power line and the second power line. A control terminal of the fourth transistor T4 is coupled to the reset signal line RL_n, and receives the reset signal RS_n from the reset signal line RL_n. The control terminal of the third transistor T3 is coupled to the control terminal of the fourth transistor T4. The control terminal of the third transistor T3 and the control terminal of the fourth transistor T4 are coupled to the same signal line.

The first terminal of the first capacitor C1 is coupled to the first terminal of the first transistor T1 and the first power line. A second terminal of the first capacitor C1 is coupled to the node N2. The first terminal of the second capacitor C2 is coupled to the node N1, and the second terminal of the second capacitor C2 is coupled to the node N2. The tunable component 210 is coupled between the second terminal of the first transistor T1 and the second power line, and receives a voltage V2 from the second power line.

In the embodiment of the disclosure, the first transistor T1, the second transistor T2, the third transistor T3, and the fourth transistor T4 may be thin film transistors or metal-oxide-semiconductor field-effect transistors (MOSFETs), but the disclosure is not limited thereto. In the embodiment of the disclosure, the first transistor T1, the second transistor T2, the third transistor T3, and the fourth transistor T4 may be a plurality of p-type transistors, but the disclosure is not limited thereto. In the embodiment of the disclosure, the tunable component 210 may be a current-controlled tunable component. In the embodiment of the disclosure, the first terminal and the second terminal of the transistor may be a source terminal and a drain terminal, and the control terminal of the transistor may be a gate terminal.

In the embodiment of the disclosure, the voltages V1, V2, and V3 are constant voltages. In the embodiment of the disclosure, the voltage V1 may be higher than the voltage V2. The voltage V3 may be a reference voltage for a data voltage of the data signal DS_m. Moreover, the voltage V3 may be dedicated and electrically isolated from the voltage V1 and the voltage V2 to mitigate a luminance shift caused by the shifts of the voltage V1 and the voltage V2 (IR-drop).

Figure 3:
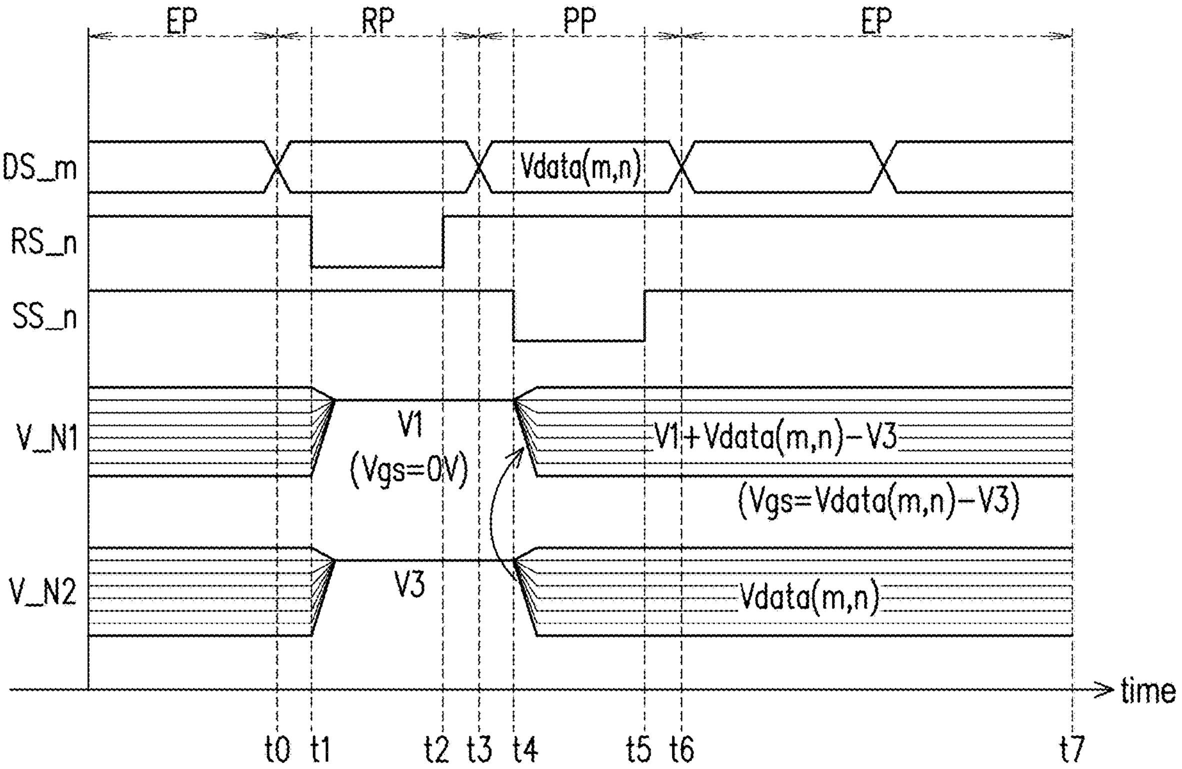
FIG. 3 is a timing diagram of relevant signals according to the embodiment of FIG. 2.

FIG. 3 is a timing diagram of relevant signals according to the embodiment of FIG. 2. Referring to FIG. 2 and FIG. 3, the pixel circuit 200 may be operated by the relevant signals as shown in FIG. 3. In the embodiment of the disclosure, the pixel circuit 200 may be sequentially operated in a reset period RP, a data program period PP, and an emission period EP. During the reset period RP from time t0 to time t3, the reset signal line RL_n provides the reset signal RS_n with a pulse from time t1 to time t2 to the control terminals of the third transistor T3 and the fourth transistor T4 (i.e. the reset signal RS_n is changed from a high voltage level to a low voltage level during the period from time t1 to time t2). During the period from time t1 to time t2, the third transistor T3 and the fourth transistor T4 are turned-on, so that the third transistor T3 provides the voltage V1 to the node N1, and the fourth transistor T4 provides the voltage V3 to the node N2. Thus, a node voltage V_N1 of the node N1 is set to the voltage V1, and a node voltage V_N2 of the node N2 is set to the voltage V3. Moreover, a gate-source voltage Vgs of the first transistor T1 may be equal to 0.

Then, during the data program period PP from time t3 to time t6, the data signal line DL_m provides the data signal DS_m with a data voltage Vdata(m,n) to the second transistor T2. During the period from time t4 to time t5, the scan signal line SL_n provides the scan signal SS_n with a pulse from time t4 to time t5 to the control terminal of the second transistor T2 (i.e. the scan signal SS_n is changed from a high voltage level to a low voltage level during the period from time t4 to time t5). Thus, the node voltage V_N2 of the node N2 is equal to the data voltage Vdata(m,n). The second capacitor C2 couples the voltage from the second terminal to the first terminal, so that the node voltage V_N1 of the node N1 is equal to the voltage V1 plus the data voltage Vdata (m,n), and minus the voltage V3. The gate-source voltage Vgs of the first transistor T1 is equal to the data voltage Vdata(m,n) minus the voltage V3. The first transistor T1 is turned-on according to the node voltage V_N1, so that a driving current flows from the first terminal of the first transistor T1 to the second terminal of the first transistor T1 to drive the tunable component 210.

That is, during the emission period EP from time t6 to time t7, if IR-drop condition occurs in the first power line or the second power line, the gate-source voltage Vgs of the first transistor T1 may be maintained by an equivalent capacitance formed by the first capacitor C1 and the second capacitor C2 connected in series. Therefore, the pixel circuit 200 may effectively improve the voltage drift of the gate-source voltage Vgs caused by IR-drop during the emission period EP. Moreover, the pixel circuit 200 may effectively transfer the data voltage Vdata(m,n) to the control terminal of the first transistor by the second capacitor C2 without any dynamic range loss of a control voltage (i.e. the voltage of the control terminal of the first transistor T1 in the data program period PP).

Figure 4:
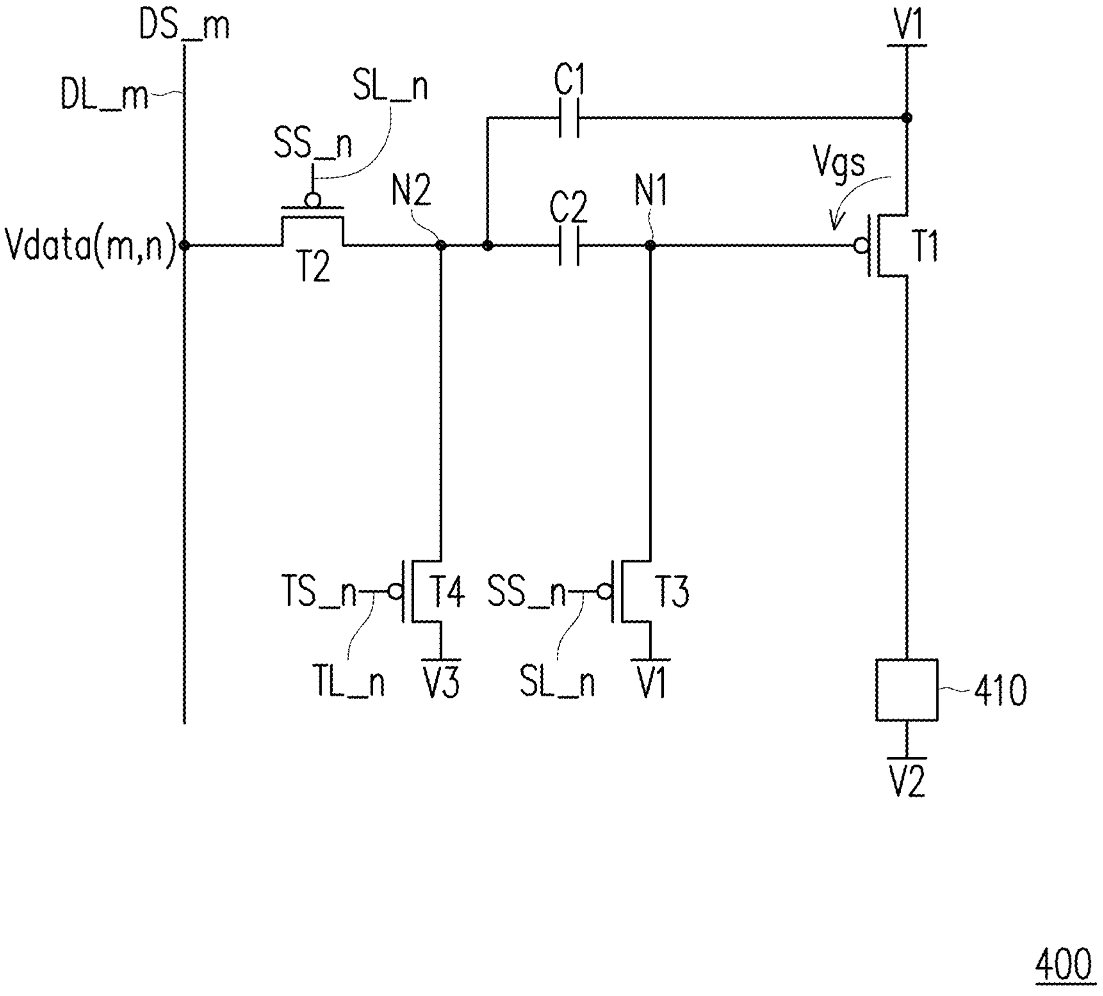
FIG. 4 is a schematic diagram of a pixel circuit according to an embodiment of the disclosure.

FIG. 4 is a schematic diagram of a pixel circuit according to an embodiment of the disclosure Referring to FIG. 4, each of the pixels P(1,1) to P(M,N) of FIG. 1 may implement a circuit architecture such as a pixel circuit 400 of FIG. 4. In the embodiment of the disclosure, the pixel circuit 400 includes a first transistor T1, a second transistor T2, a third transistor T3, a fourth transistor T4, a first capacitor C1, a second capacitor C2, and a tunable component 410. The pixel circuit 400 may further include a first power line, a second power line, a reference voltage line, a data signal line DL_m, a scan signal line SL_n, and a set signal line TL_n.

In the embodiment of the disclosure, a first terminal of the first transistor T1 is coupled to the first power line and a first terminal of the capacitor C1, and receives a voltage V1 from the first power line. A second terminal of the first transistor T1 is coupled to the tunable component 410. A control terminal of the first transistor T1 is coupled to a node N1.

A first terminal of the second transistor T2 is coupled to the data signal line DL_m, and receives a data signal DS_m from the data signal line DL_m. A second terminal of the second transistor T2 is coupled to a node N2. A control terminal of the second transistor T2 is coupled to the scan signal line SL_n, and receives a scan signal SS_n from the scan signal line SL_n.

A first terminal of the third transistor T3 is coupled to the node N1. A second terminal of the third transistor T3 is coupled to the first power line, and receives the voltage V1 from the first power line. A control terminal of the third transistor T3 is coupled to the scan signal line SL_n, and receives a scan signal SS_n from the scan signal line SL_n.

A first terminal of the fourth transistor T4 is coupled to node N2. A second terminal of the fourth transistor T4 is coupled to the reference voltage line, and receives a voltage V3 from the reference voltage line. The reference voltage line is dedicated and electrically isolated from the first power line and the second power line. A control terminal of the fourth transistor T4 is coupled to the set signal line TL_n, and receives the set signal TS_n from the set signal line TL_n. The control terminal of the third transistor T3 and the control terminal of the fourth transistor T4 are coupled to different signal lines.

The first terminal of the first capacitor C1 is coupled to the first terminal of the first transistor T1 and the first power line. A second terminal of the first capacitor C1 is coupled to the node N2. The first terminal of the second capacitor C2 is coupled to the node N1, and the second terminal of the second capacitor C2 is coupled to the node N2. The tunable component 410 is coupled between the second terminal of the first transistor T1 and the second power line, and receives a voltage V2 from the second power line.

In the embodiment of the disclosure, the voltages V1, V2, and V3 are constant voltages. In the embodiment of the disclosure, the voltage V1 may be higher than the voltage V2. The voltage V3 may be a reference voltage for a data voltage of the data signal DS_m. Moreover, the voltage V3 may be dedicated and electrically isolated from the voltage V1 and the voltage V2 to mitigate a luminance shift caused by the shifts of the voltage V1 and the voltage V2 (IR-drop).

Figure 5:
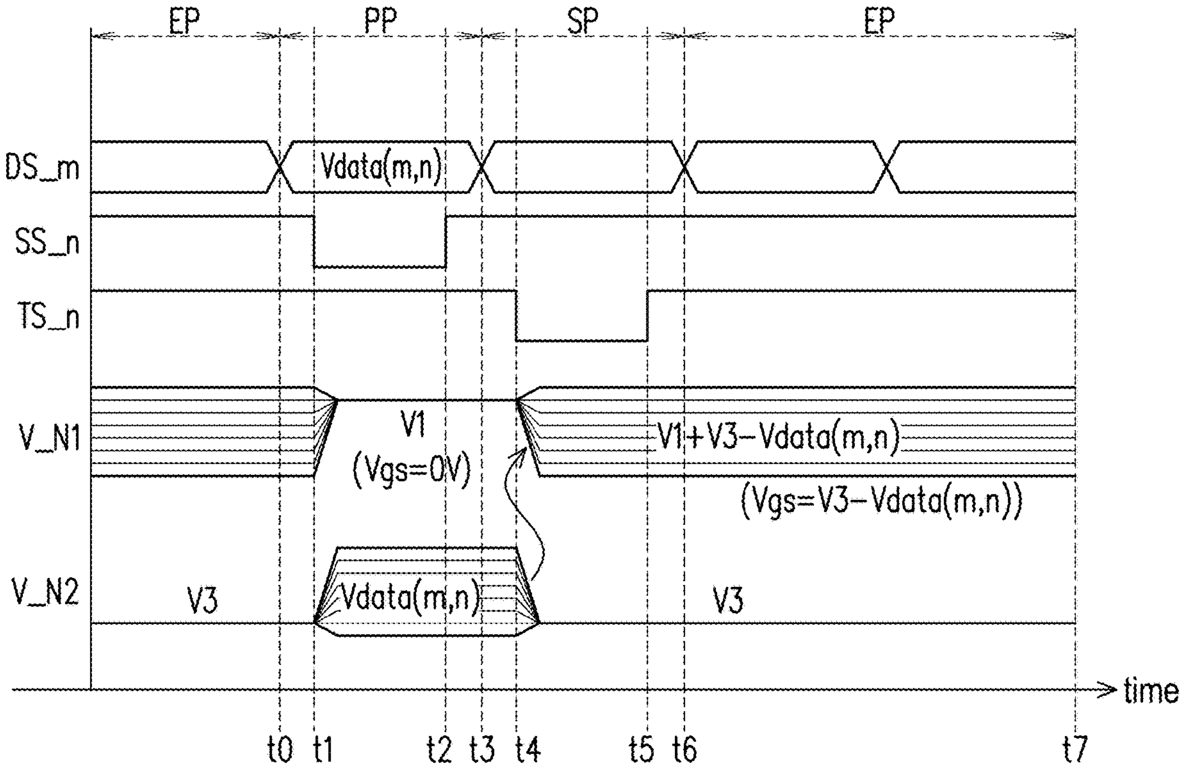
FIG. 5 is a timing diagram of relevant signals according to the embodiment of FIG. 4.

FIG. 5 is a timing diagram of relevant signals according to the embodiment of FIG. 4. Referring to FIG. 4 and FIG. 5, the pixel circuit 400 may be operated by the relevant signals as shown in FIG. 5. In the embodiment of the disclosure, the pixel circuit 400 may be sequentially operated in a data program period PP, a data setup period SP, and an emission period EP. During the data program period PP from time t0 to time t3, the data signal line DL_m provides the data signal DS_m with a data voltage Vdata(m,n) to the second transistor T2. During the period from time t1 to time t2, the scan signal line SL_n provides the scan signal SS_n with a pulse from time t1 to time t2 to the control terminals of the second transistor T2 and the third transistor T3 (i.e. the scan signal SS_n is changed from a high voltage level to a low voltage level during the period from time t1 to time t2). During the period from time t1 to time t2, the second transistor T2 and the third transistor T3 are turned-on, so that the second transistor T2 provides the data voltage Vdata(m, n) to the node N2, and the third transistor T3 provides the voltage V1 to the node N1. Thus, a node voltage V_N1 of the node N1 is set to the voltage V1, and a node voltage V_N2 of the node N2 is set to the data voltage Vdata(m,n). Moreover, a gate-source voltage Vgs of the first transistor T1 may be equal to 0.

Then, during the data setup period SP from time t3 to time t6, the set signal line TL_n provides the set signal TS_n with a pulse from time t4 to time t5 to the control terminal of the fourth transistor T4 (i.e. the set signal TS_n is changed from a high voltage level to a low voltage level during the period from time t4 to time t5). Thus, the node voltage V_N2 of the node N2 is set to the voltage V3. The second capacitor C2 couples the voltage from the second terminal to the first terminal, so that the node voltage V_N1 of the node N1 is equal to the voltage V1 plus the voltage V3, and minus the data voltage Vdata(m,n). The gate-source voltage Vgs of the first transistor T1 is equal to the voltage V3 minus the data voltage Vdata(m,n). The first transistor T1 is turned-on according to the node voltage V_N1, so that a driving current flows from the first terminal of the first transistor T1 to the second terminal of the first transistor T1 to drive the tunable component 410.

That is, during the emission period EP from time t6 to time t7, if IR-drop condition occurs in the first power line or the second power line, the gate-source voltage Vgs of the first transistor T1 may be maintained by an equivalent capacitance formed by the first capacitor C1 and the second capacitor C2 connected in series. Therefore, the pixel circuit 400 may effectively improve the voltage drift of the gate-source voltage Vgs caused by IR-drop during the emission period EP. Moreover, the pixel circuit 400 may effectively transfer the data voltage Vdata(m,n) to the control terminal of the first transistor by the second capacitor C2 without any dynamic range loss of a control voltage (i.e. the voltage of the control terminal of the first transistor T1 in the data setup period SP).

Figure 6:
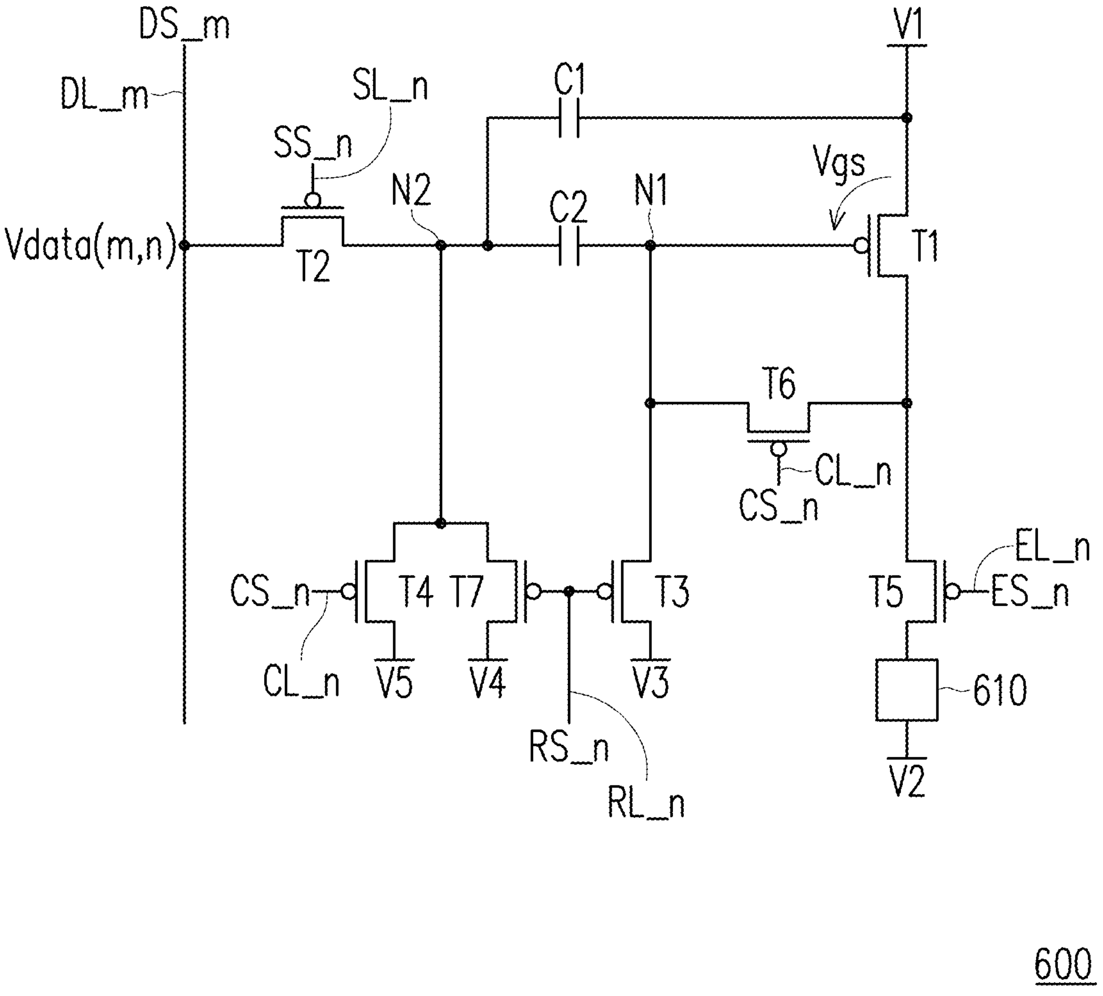
FIG. 6 is a schematic diagram of a pixel circuit according to an embodiment of the disclosure.

FIG. 6 is a schematic diagram of a pixel circuit according to an embodiment of the disclosure. Referring to FIG. 6, each of the pixels P(1,1) to P(M,N) of FIG. 1 may implement a circuit architecture such as a pixel circuit 600 of FIG. 6. In the embodiment of the disclosure, the pixel circuit 600 includes a first transistor T1, a second transistor T2, a third transistor T3, a fourth transistor T4, a fifth transistor T5, a sixth transistor T6, a seventh transistor T7, a first capacitor C1, a second capacitor C2, and a tunable component 610. The pixel circuit 600 may further include a first power line, a second power line, a plurality of reset voltage lines, a reference voltage line, a data signal line DL_m, a scan signal line SL_n, a reset signal line RL_n, and a compensation signal line CL_n.

In the embodiment of the disclosure, a first terminal of the first transistor T1 is coupled to the first power line and a first terminal of the capacitor C1, and receives a voltage V1 from the first power line. A second terminal of the first transistor T1 is coupled to the fifth transistor T5 and the sixth transistor T6. A control terminal of the first transistor T1 is coupled to a node N1.

A first terminal of the second transistor T2 is coupled to the data signal line DL_m, and receives a data signal DS_m from the data signal line DL_m. A second terminal of the second transistor T2 is coupled to a node N2. A control terminal of the second transistor T2 is coupled to the scan signal line SL_n, and receives a scan signal SS_n from the scan signal line SL_n.

A first terminal of the third transistor T3 is coupled to the node N1. A second terminal of the third transistor T3 is coupled to a first reset voltage line, and receives the voltage V3 from the first reset voltage line. A control terminal of the third transistor T3 is coupled to the reset signal line RL_n, and receives a reset signal RS_n from the reset signal line RL_n. In one embodiment, the first reset voltage line can be replaced by the second power line.

A first terminal of the fourth transistor T4 is coupled to node N2. A second terminal of the fourth transistor T4 is coupled to the reference voltage line, and receives a voltage V5 from the reference voltage line. The reference voltage line is dedicated and electrically isolated from the first power line and the second power line. A control terminal of the fourth transistor T4 is coupled to the compensation signal line CL_n, and receives the compensation signal CS_n from the compensation signal line CL_n.

A first terminal of the fifth transistor T5 is coupled to the second terminal of the first transistor T1 and the sixth transistor T6. A second terminal of the fifth transistor T5 is coupled to the tunable component 610. A control terminal of the fifth transistor T5 is coupled to the emission signal line EL_n, and receives an emission signal ES_n from the emission signal line EL_n.

A first terminal of the sixth transistor T6 is coupled to the second terminal of the first transistor T1 and the first terminal of the fifth transistor T5. A second terminal of the sixth transistor T6 is coupled to the node N1 and the first terminal of the third transistor T3. A control terminal of the sixth transistor T6 is coupled to the compensation signal line CL_n, and receives a compensation signal CS_n from the compensation signal line CL_n.

A first terminal of the seventh transistor T7 is coupled to the second node N2. A second terminal of the seventh transistor T7 is coupled to the second reset voltage line, and receives the voltage V4 from the second reset voltage line. A control terminal of the seventh transistor T7 is coupled to the reset signal line RL_n, and receives the reset signal RS_n from the reset signal line RL_n. In one embodiment, the second reset voltage line can be replaced by the first power line.

The first terminal of the first capacitor C1 is coupled to the first terminal of the first transistor T1 and the first power line. A second terminal of the first capacitor C1 is coupled to the node N2. The first terminal of the second capacitor C2 is coupled to the node N1, and the second terminal of the second capacitor C2 is coupled to the node N2. The tunable component 610 is coupled between the second terminal of the fifth transistor T5 and the second power line, and receives a voltage V2 from the second power line.

In the embodiment of the disclosure, the first transistor T1, the second transistor T2, the third transistor T3, the fourth transistor T4, the fifth transistor T5, the sixth transistor T6, and the seventh transistor T7 may be a plurality of p-type transistors, but the disclosure is not limited thereto. In the embodiment of the disclosure, the voltages V1, V2, V3, V4, and V5 are constant voltages. In the embodiment of the disclosure, the voltage V1 may be higher than the voltage V2, and the voltage V1 may also be higher than the voltage V3. In one embodiment of the disclosure, the voltage V2 may equal to the voltage V3, the voltage V1 may equal to the voltage V4, or the voltage V4 may equal to the voltage V5. The voltage V5 may be a reference voltage for a data voltage of the data signal DS_m. Moreover, the voltage V5 may be dedicated and electrically isolated from the voltage V1 and the voltage V2 to mitigate a luminance shift caused by the shifts of the voltage V1 and the voltage V2 (IR-drop).

In addition, in the embodiment of the disclosure, the first transistor T1 is the p-type transistor, thus the node voltage V_N1 of the node N1 may be lower than the node voltage V_N2 of the node N2, but the disclosure is not limited thereto. In one embodiment of the disclosure, the first transistor T1 may be an n-type transistor, and the node voltage V_N1 of the node N1 may be higher than the node voltage V_N2 of the node N2, but the disclosure is not limited thereto.

Figure 7:
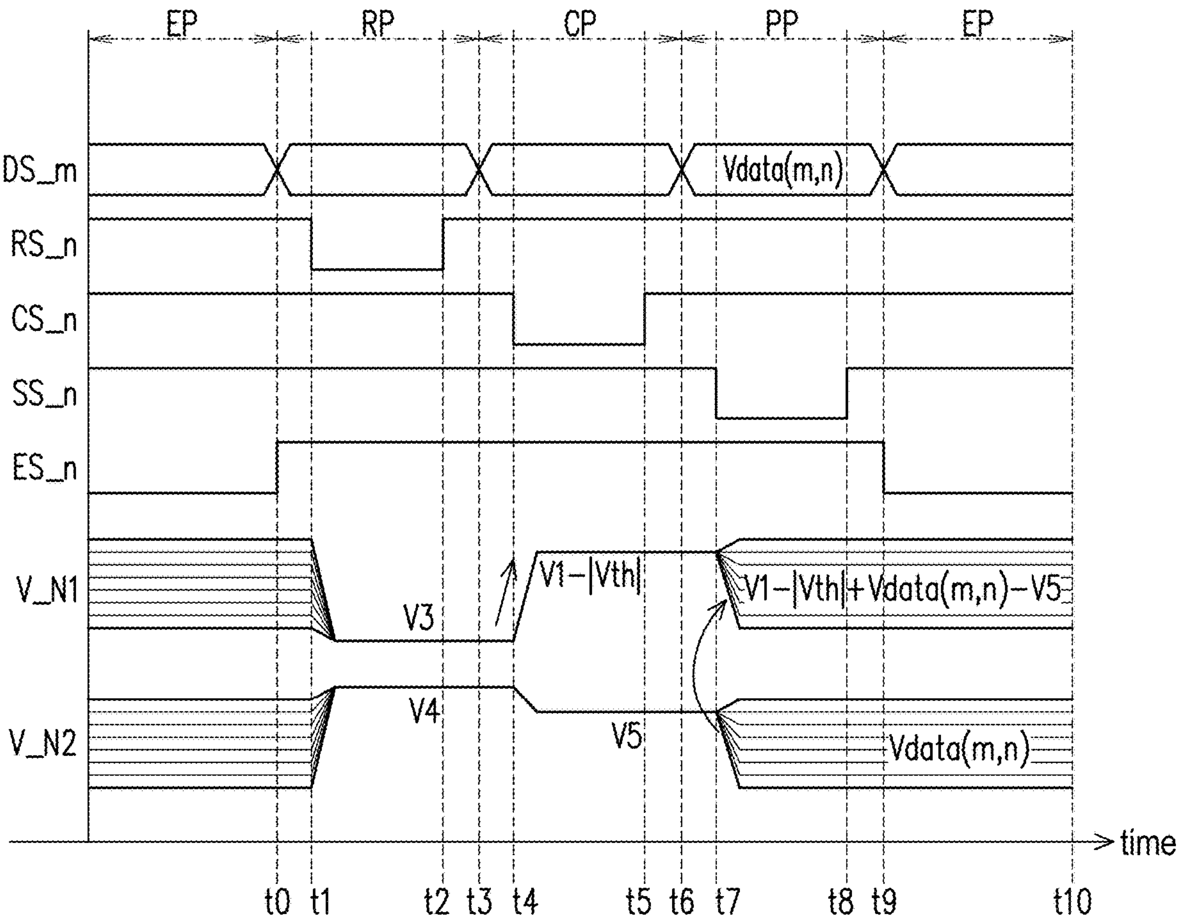
FIG. 7 is a timing diagram of relevant signals according to the embodiment of FIG. 6.

FIG. 7 is a timing diagram of relevant signals according to the embodiment of FIG. 6. Referring to FIG. 6 and FIG. 7, the pixel circuit 600 may be operated by the relevant signals as shown in FIG. 7. In the embodiment of the disclosure, the pixel circuit 600 may be sequentially operated in a reset period RP, a compensation period CP, a data program period PP, and an emission period EP. During the reset period RP from time t0 to time t3, the reset signal line RL_n provides the reset signal RS_n with a pulse from time t1 to time t2 to the control terminals of the third transistor T3 and the seventh transistor T7 (i.e. the reset signal RS_n is changed from a high voltage level to a low voltage level during the period from time t1 to time t2). During the period from time t1 to time t2, the third transistor T3 and the seventh transistor T7 are turned-on, so that the third transistor T3 provides the voltage V3 to the node N1, and the seventh transistor T7 provides the voltage V4 to the node N2. Thus, the node voltage V_N1 of the node N1 is set to the voltage V3, and the node voltage V_N2 of the node N2 is set to the voltage V4.

During the compensation period CP from time t3 to time t6, the compensation signal line CL_n provides the compensation signal CS_n with a pulse from time t4 to time t5 to the control terminals of the sixth transistor T6 and the fourth transistor T4 (i.e. the compensation signal CS_n is changed from a high voltage level to a low voltage level during the period from time t4 to time t5). During the period from time t4 to time t5, the sixth transistor T6 and the fourth transistor T4 are turned-on, so that the node voltage V_N1 of the node N1 is set to the voltage equal to the voltage V1 minus an absolute value of a threshold voltage |Vth| of the first transistor T1, and the node voltage V_N2 is set to the voltage V5.

Then, during the data program period PP from time t6 to time t9, the data signal line DL_m provides the data signal DS_m with a data voltage Vdata(m,n) to the second transistor T2. During the period from time t7 to time t8, the scan signal line SL_n provides the scan signal SS_n with a pulse from time t7 to time t8 to the control terminal of the second transistor T2 (i.e. the scan signal SS_n is changed from a high voltage level to a low voltage level during the period from time t7 to time t8). Thus, the node voltage V_N2 of the node N2 is set to the data voltage Vdata(m,n). The second capacitor C2 couples the voltage from the second terminal to the first terminal, so that the node voltage V_N1 of the node N1 is equal to the voltage V1 minus the absolute value of a threshold voltage |Vth|, plus the data voltage Vdata(m,n), and minus the voltage V5. The first transistor T1 is turned-on according to the node voltage V_N1, so that a driving current flows from the first terminal of the first transistor T1 to the second terminal of the first transistor T1.

Moreover, during the period from time t9 to time t10, the emission signal line EL_n provides the emission signal ES_n, and the emission signal ES_n is changed from a high voltage level to a low voltage level. Thus, the fifth transistor T5 is turned-on to provide the driving current to drive the tunable component 610.

That is, during the emission period EP from time t9 to time t10, if IR-drop condition occurs in the first power line or the second power line, the gate-source voltage Vgs of the first transistor T1 may be maintained by an equivalent capacitance formed by the first capacitor C1 and the second capacitor C2 connected in series. Therefore, the pixel circuit 600 may effectively improve the voltage drift of the gate-source voltage Vgs caused by IR-drop during the emission period EP. Moreover, the pixel circuit 600 may effectively transfer the data voltage Vdata(m,n) to the control terminal of the first transistor by the second capacitor C2 without any dynamic range loss of a control voltage (i.e. the voltage of the control terminal of the first transistor T1 in the data program period PP). Furthermore, the gate-source voltage Vgs of the first transistor T1 may be set with a compensation for the threshold voltage |Vth| to improve the driving current uniformity.

Figure 8:
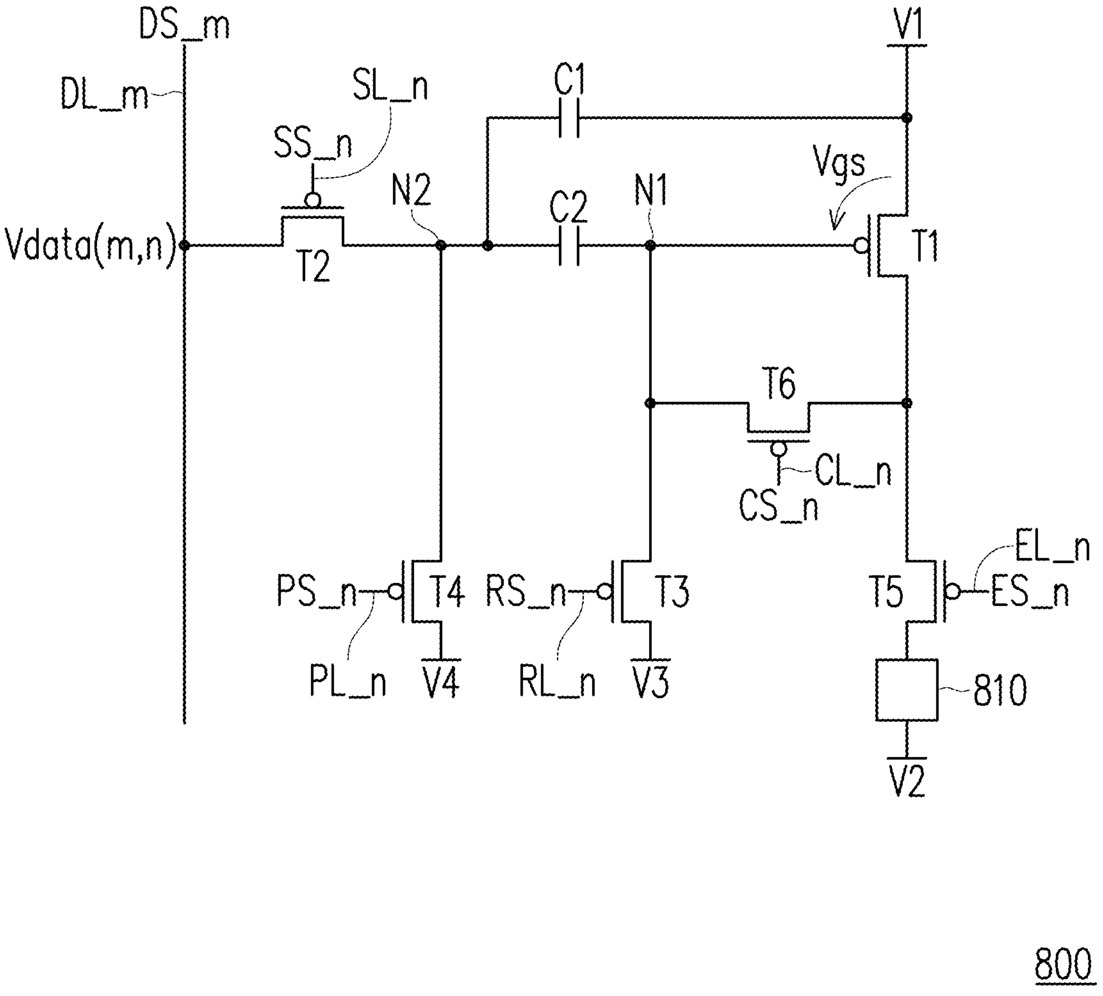
FIG. 8 is a schematic diagram of a pixel circuit according to an embodiment of the disclosure.

FIG. 8 is a schematic diagram of a pixel circuit according to an embodiment of the disclosure. Referring to FIG. 8, each of the pixels P(1,1) to P(M,N) of FIG. 1 may implement a circuit architecture such as a pixel circuit 800 of FIG. 8. In the embodiment of the disclosure, the pixel circuit 800 includes a first transistor T1, a second transistor T2, a third transistor T3, a fourth transistor T4, a fifth transistor T5, a sixth transistor T6, a first capacitor C1, a second capacitor C2, and a tunable component 810. The pixel circuit 800 may further include a first power line, a second power line, a reset voltage line, a reference voltage line, a data signal line DL_m, a scan signal line SL_n, a reset signal line RL_n, a compensation signal line CL_n, and a preset signal ling PL_n.

In the embodiment of the disclosure, a first terminal of the first transistor T1 is coupled to the first power line and a first terminal of the capacitor C1, and receives a voltage V1 from the first power line. A second terminal of the first transistor T1 is coupled to the fifth transistor T5 and the sixth transistor T6. A control terminal of the first transistor T1 is coupled to a node N1.

A first terminal of the second transistor T2 is coupled to the data signal line DL_m, and receives a data signal DS_m from the data signal line DL_m. A second terminal of the second transistor T2 is coupled to a node N2. A control terminal of the second transistor T2 is coupled to the scan signal line SL_n, and receives a scan signal SS_n from the scan signal line SL_n.

A first terminal of the third transistor T3 is coupled to the node N1. A second terminal of the third transistor T3 is coupled to the reset voltage line, and receives a voltage V3 from the reset voltage line. A control terminal of the third transistor T3 is coupled to the reset signal line RL_n, and receives a reset signal RS_n from the reset signal line RL_n. In one embodiment, the reset voltage line can be replaced by the second power line.

A first terminal of the fourth transistor T4 is coupled to node N2. A second terminal of the fourth transistor T4 is coupled to the reference voltage line, and receives a voltage V4 from the reference voltage line. The reference voltage line is dedicated and electrically isolated from the first power line and the second power line. A control terminal of the fourth transistor T4 is coupled to the preset signal line PL_n, and receives a preset signal PS_n from the preset signal line PL_n.

A first terminal of the fifth transistor T5 is coupled to the second terminal of the first transistor T1 and the sixth transistor T6. A second terminal of the fifth transistor T5 is coupled to the tunable component 810. A control terminal of the fifth transistor T5 is coupled to the emission signal line EL_n, and receives an emission signal ES_n from the emission signal line EL_n.

A first terminal of the sixth transistor T6 is coupled to the second terminal of the first transistor T1 and the first terminal of the fifth transistor T5. A second terminal of the sixth transistor T6 is coupled to the node N1 and the first terminal of the third transistor T3. A control terminal of the sixth transistor T6 is coupled to the compensation signal line CL_n, and receives a compensation signal CS_n from the compensation signal line CL_n.

The first terminal of the first capacitor C1 is coupled to the first terminal of the first transistor T1 and the first power line. A second terminal of the first capacitor C1 is coupled to the node N2. The first terminal of the second capacitor C2 is coupled to the node N1, and the second terminal of the second capacitor C2 is coupled to the node N2. The tunable component 810 is coupled between the second terminal of the fifth transistor T5 and the second power line, and receives a voltage V2 from the second power line.

In the embodiment of the disclosure, the first transistor T1, the second transistor T2, the third transistor T3, the fourth transistor T4, the fifth transistor T5, and the sixth transistor T6 may be a plurality of p-type transistors, but the disclosure is not limited thereto. In the embodiment of the disclosure, the voltages V1, V2, V3, and V4 are constant voltages. In the embodiment of the disclosure, the voltage V1 may be higher than the voltage V2, and the voltage V1 may also be higher than the voltage V3. In one embodiment of the disclosure, the voltage V2 may equal to the voltage V3. The voltage V4 may be a reference voltage for a data voltage of the data signal DS_m. Moreover, the voltage V4 may be dedicated and electrically isolated from the voltage V1 and the voltage V2 to mitigate a luminance shift caused by the shifts of the voltage V1 and the voltage V2 (IR-drop).

In addition, in the embodiment of the disclosure, the first transistor T1 is the p-type transistor, thus the node voltage V_N1 of the node N1 may be lower than the node voltage V_N2 of the node N2, but the disclosure is not limited thereto. In one embodiment of the disclosure, the first transistor T1 may be an n-type transistor, and the node voltage V_N1 of the node N1 may be higher than the node voltage V_N2 of the node N2, but the disclosure is not limited thereto.

Figure 9:
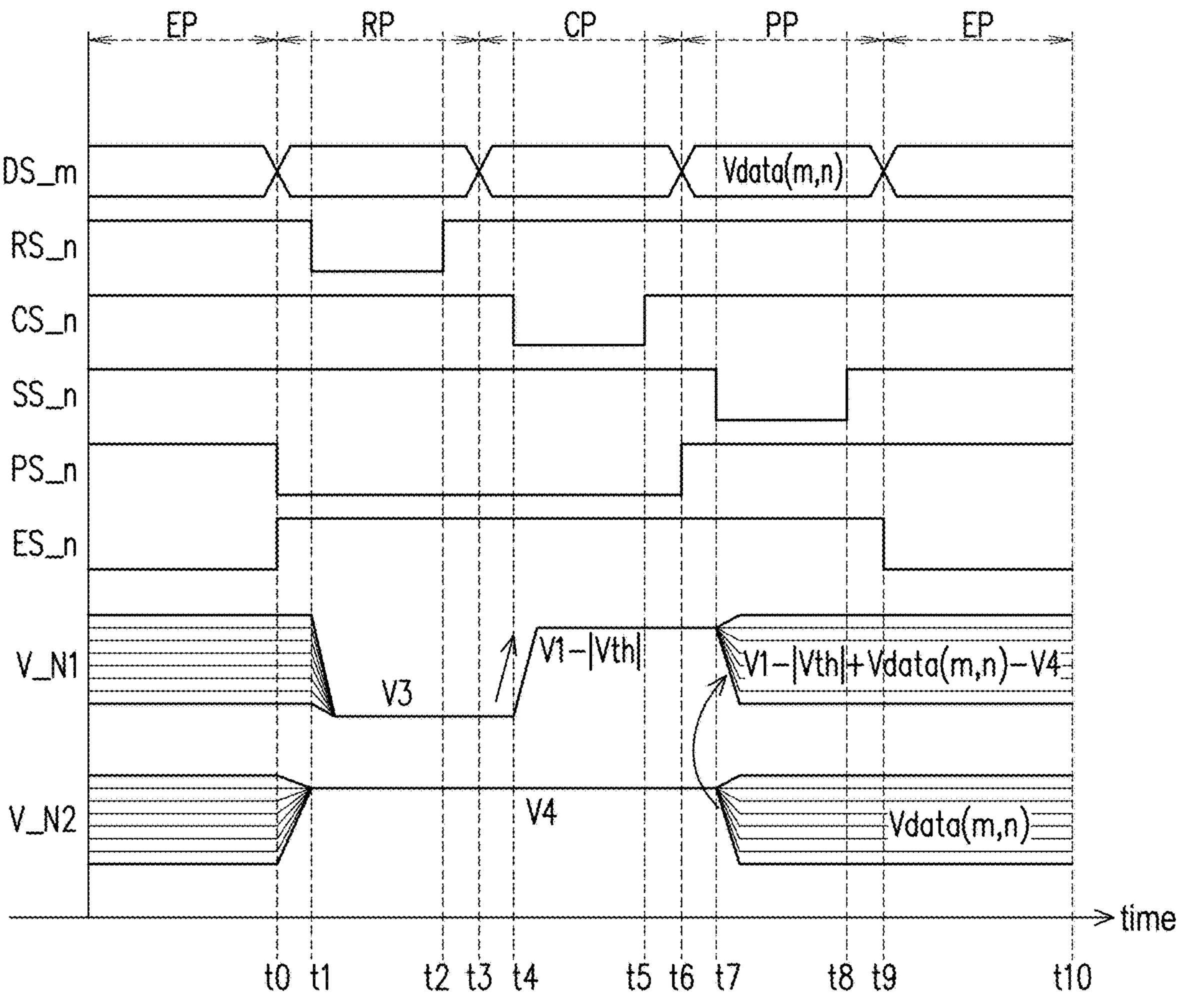
FIG. 9 is a timing diagram of relevant signals according to the embodiment of FIG. 8.

FIG. 9 is a timing diagram of relevant signals according to the embodiment of FIG. 8. Referring to FIG. 8 and FIG. 9, the pixel circuit 800 may be operated by the relevant signals as shown in FIG. 9. In the embodiment of the disclosure, the pixel circuit 800 may be sequentially operated in a reset period RP, a compensation period CP, a data program period PP, and an emission period EP. During the reset period RP from time t0 to time t3, the reset signal line RL_n provides the reset signal RS_n with a pulse from time t1 to time t2 to the control terminal of the third transistor T3 (i.e. the reset signal RS_n is changed from a high voltage level to a low voltage level during the period from time t1 to time t2). During the period from time t1 to time t2, the third transistor T3 is turned-on, so that the third transistor T3 provides the voltage V3 to the node N1. Thus, the node voltage V_N1 of the node N1 is set to the voltage V3.

During the compensation period CP from time t3 to time t6, the compensation signal line CL_n provides the compensation signal CS_n with a pulse from time t4 to time t5 to the control terminal of the sixth transistor T6 (i.e. the compensation signal CS_n is changed from a high voltage level to a low voltage level during the period from time t4 to time t5). During the period from time t4 to time t5, the sixth transistor T6 is turned-on, so that the node voltage V_N1 of the node N1 is set to the voltage equal to the voltage V1 minus an absolute value of a threshold voltage|Vth| of the first transistor T1.

During the reset period RP and the compensation period CP from time t0 to time t6, the preset signal line PL_n provides the preset signal PS_n with a pulse from time t0 to time t6 to the control terminal of the fourth transistor T4 (i.e. the preset signal PS_n is changed from a high voltage level to a low voltage level during the period from time t0 to time t6). During the period from time t0 to time t6, the fourth transistor T4 is turned-on, so that the fourth transistor T4 provides the voltage V4 to the node N2. Thus, the node voltage V_N2 of the node N2 is set and maintained at the voltage V4 during the period from time t0 to time t7.

Then, during the data program period PP from time t6 to time t9, the data signal line DL_m provides the data signal DS_m with a data voltage Vdata(m,n) to the second transistor T2. During the period from time t7 to time t8, the scan signal line SL_n provides the scan signal SS_n with a pulse from time t7 to time t8 to the control terminal of the second transistor T2 (i.e. the scan signal SS_n is changed from a high voltage level to a low voltage level during the period from time t7 to time t8). Thus, the node voltage V_N2 of the node N2 is set to the data voltage Vdata(m,n). The second capacitor C2 couples the voltage from the second terminal to the first terminal, so that the node voltage V_N1 of the node N1 is equal to the voltage V1 minus the absolute value of a threshold voltage |Vth|, plus the data voltage Vdata(m,n), and minus the voltage V4. The first transistor T1 is turned-on according to the node voltage V_N1, so that a driving current flows from the first terminal of the first transistor T1 to the second terminal of the first transistor T1.

Moreover, during the period from time t9 to time t10, the emission signal line EL_n provides the emission signal ES_n, and the emission signal ES_n is changed from a high voltage level to a low voltage level. Thus, the fifth transistor T5 is turned-on to provide the driving current to drive the tunable component 810.

That is, during the emission period EP from time t9 to time t10, if IR-drop condition occurs in the first power line or the second power line, the gate-source voltage Vgs of the first transistor T1 may be maintained by an equivalent capacitance formed by the first capacitor C1 and the second capacitor C2 connected in series. Therefore, the pixel circuit 800 may effectively improve the voltage drift of the gate-source voltage Vgs caused by IR-drop during the emission period EP. Moreover, the pixel circuit 800 may effectively transfer the data voltage Vdata(m,n) to the control terminal of the first transistor by the second capacitor C2 without any dynamic range loss of a control voltage (i.e. the voltage of the control terminal of the first transistor T1 in the data program period PP). Furthermore, the gate-source voltage Vgs of the first transistor T1 may be set with a compensation for the threshold voltage |Vth| to improve uniformity of the driving current.

Figure 10:
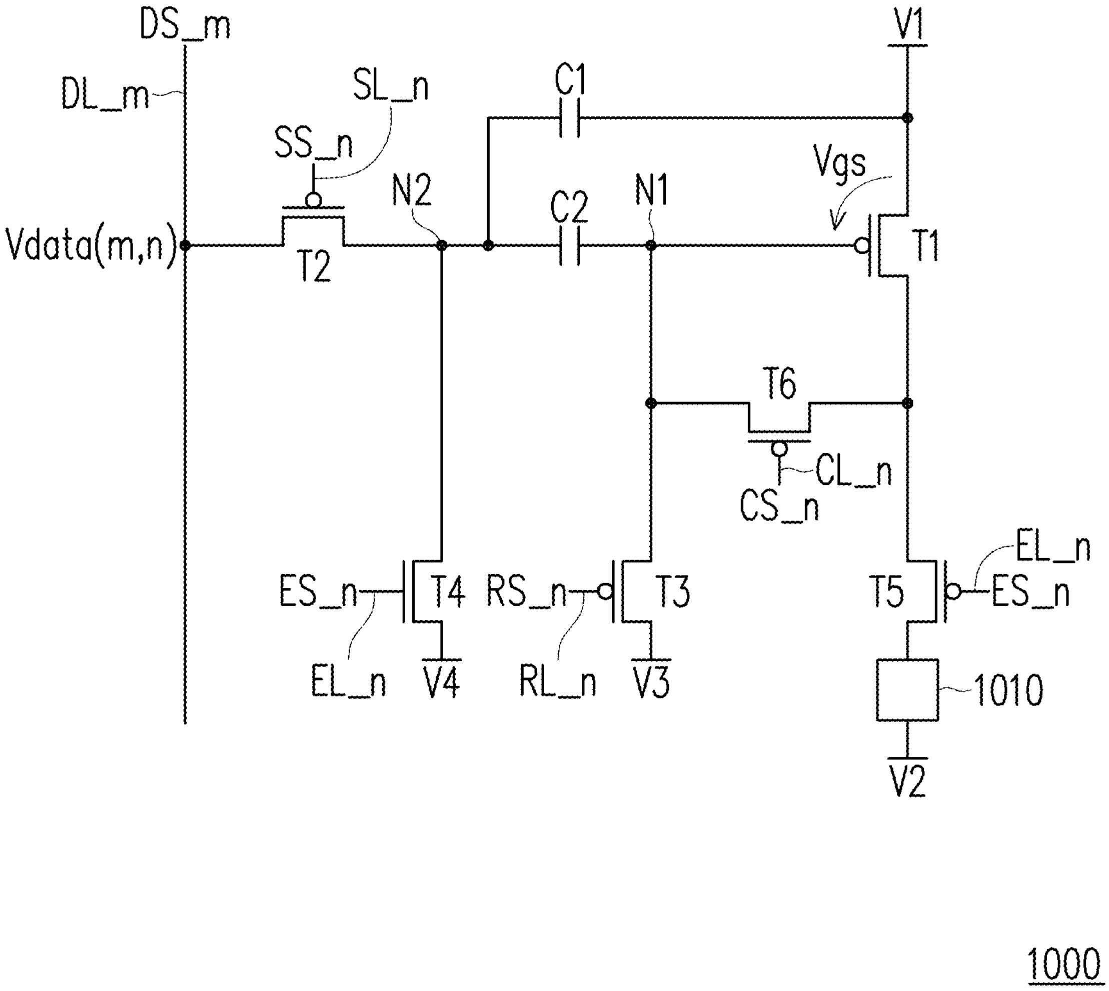
FIG. 10 is a schematic diagram of a pixel circuit according to an embodiment of the disclosure.

FIG. 10 is a schematic diagram of a pixel circuit according to an embodiment of the disclosure. Referring to FIG. 10, each of the pixels P(1,1) to P(M,N) of FIG. 1 may implement a circuit architecture such as a pixel circuit 1000 of FIG. 10. In the embodiment of the disclosure, the pixel circuit 1000 includes a first transistor T1, a second transistor T2, a third transistor T3, a fourth transistor T4, a fifth transistor T5, a sixth transistor T6, a first capacitor C1, a second capacitor C2, and a tunable component 1010. The pixel circuit 1000 may further include a first power line, a second power line, a reset voltage line, a reference voltage line, a data signal line DL_m, a scan signal line SL_n, a reset signal line RL_n, a compensation signal line CL_n, and an emission signal line EL_n. In the embodiment of the disclosure, the tunable component 1010 may be, for example, a light emitting diode or an organic light emitting diode.

In the embodiment of the disclosure, a first terminal of the first transistor T1 is coupled to the first power line and a first terminal of the capacitor C1, and receives a voltage V1 from the first power line. A second terminal of the first transistor T1 is coupled to the fifth transistor T5 and the sixth transistor T6. A control terminal of the first transistor T1 is coupled to a node N1.

A first terminal of the second transistor T2 is coupled to the data signal line DL_m, and receives a data signal DS_m from the data signal line DL_m. A second terminal of the second transistor T2 is coupled to a node N2. A control terminal of the second transistor T2 is coupled to the scan signal line SL_n, and receives a scan signal SS_n from the scan signal line SL_n.

A first terminal of the third transistor T3 is coupled to the node N1. A second terminal of the third transistor T3 is coupled to the reset voltage line, and receives a voltage V3 from the reset voltage line. A control terminal of the third transistor T3 is coupled to the reset signal line RL_n, and receives a reset signal RS_n from the reset signal line RL_n. In one embodiment, the reset voltage line can be replaced by the second power line.

A first terminal of the fourth transistor T4 is coupled to node N2. A second terminal of the fourth transistor T4 is coupled to the reference voltage line, and receives a voltage V4 from the reference voltage line. The reference voltage line is dedicated and electrically isolated from the first power line and the second power line. A control terminal of the fourth transistor T4 is coupled to the emission signal line EL_n, and receives an emission signal ES_n from the emission signal line EL_n.

A first terminal of the fifth transistor T5 is coupled to the second terminal of the first transistor T1 and the sixth transistor T6. A second terminal of the fifth transistor T5 is coupled to the tunable component 1010. A control terminal of the fifth transistor T5 is coupled to the emission signal line EL_n, and receives the emission signal ES_n from the emission signal line EL_n.

A first terminal of the sixth transistor T6 is coupled to the second terminal of the first transistor T1 and the first terminal of the fifth transistor T5. A second terminal of the sixth transistor T6 is coupled to the node N1 and the first terminal of the third transistor T3. A control terminal of the sixth transistor T6 is coupled to the compensation signal line CL_n, and receives a compensation signal CS_n from the compensation signal line CL_n.

The first terminal of the first capacitor C1 is coupled to the first terminal of the first transistor T1 and the first power line. A second terminal of the first capacitor C1 is coupled to the node N2. The first terminal of the second capacitor C2 is coupled to the node N1, and the second terminal of the second capacitor C2 is coupled to the node N2. The tunable component 1010 is coupled between the second terminal of the fifth transistor T5 and the second power line, and receives a voltage V2 from the second power line.

In the embodiment of the disclosure, the first transistor T1, the second transistor T2, the third transistor T3, the fifth transistor T5, and the sixth transistor T6 may be a plurality of p-type transistors, the fourth transistor T4 may be an n-type transistor, but the disclosure is not limited thereto. In one embodiment of the disclosure, one of the fourth transistor T4 and the fifth transistor T5 is the p-type transistor, and another one of the fourth transistor T4 and the fifth transistor T5 is the n-type transistor. In the embodiment of the disclosure, the voltages V1, V2, V3, and V4 are constant voltages. In the embodiment of the disclosure, the voltage V1 may be higher than the voltage V2, and the voltage V1 may also be higher than the voltage V3. In one embodiment of the disclosure, the voltage V2 may equal to the voltage V3. The voltage V4 may be a reference voltage for a data voltage of the data signal DS_m. Moreover, the voltage V4 may be dedicated and electrically isolated from the voltage V1 and the voltage V2 to mitigate a luminance shift caused by the shifts of the voltage V1 and the voltage V2 (IR-drop).

Figure 11:
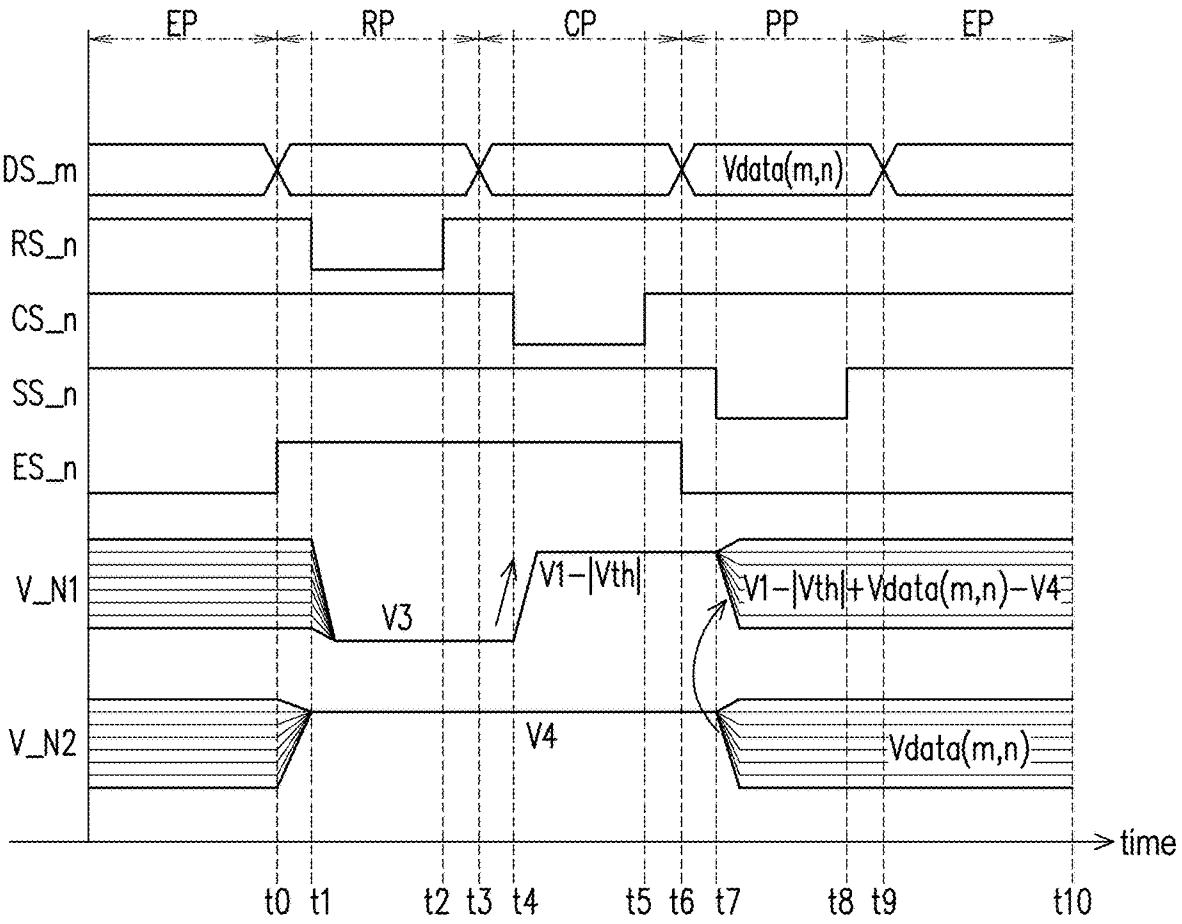
FIG. 11 is a timing diagram of relevant signals according to the embodiment of FIG. 10.

FIG. 11 is a timing diagram of relevant signals according to the embodiment of FIG. 10. Referring to FIG. 10 and FIG. 11, the pixel circuit 1000 may be operated by the relevant signals as shown in FIG. 11. In the embodiment of the disclosure, the pixel circuit 1000 may be sequentially operated in a reset period RP, a compensation period CP, a data program period PP, and an emission period EP. During the reset period RP from time t0 to time t3, the reset signal line RL_n provides the reset signal RS_n with a pulse from time t1 to time t2 to the control terminal of the third transistor T3 (i.e. the reset signal RS_n is changed from a high voltage level to a low voltage level during the period from time t1 to time t2). During the period from time t1 to time t2, the third transistor T3 is turned-on, so that the third transistor T3 provides the voltage V3 to the node N1. Thus, a node voltage V_N1 of the node N1 is set to the voltage V3.

During the compensation period CP from time t3 to time t6, the compensation signal line CL_n provides the compensation signal CS_n with a pulse from time t4 to time t5 to the control terminal of the sixth transistor T6 (i.e. the compensation signal CS_n is changed from a high voltage level to a low voltage level during the period from time t4 to time t5). During the period from time t4 to time t5, the sixth transistor T6 is turned-on, so that the node voltage V_N1 of the node N1 is set to the voltage equal to the voltage V1 minus an absolute value of a threshold voltage|Vth| of the first transistor T1.

During the reset period RP and the compensation period CP from time t0 to time t6, the emission signal line EL_n provides the emission signal ES_n with a pulse from time t0 to time t6 to the control terminals of the fourth transistor T4 and the fifth transistor T5 (i.e. the emission signal ES_n is changed from a low voltage level to a high voltage level during the period from time t0 to time t6). During the period from time t0 to time t6, the fourth transistor T4 is turned-on, so that the fourth transistor T4 provides the voltage V4 to the node N2. Thus, a node voltage V_N2 of the node N2 is set and maintained at the voltage V4 during the period from time t0 to time t7.

Then, during the data program period PP from time t6 to time t9, the data signal line DL_m provides the data signal DS_m with a data voltage Vdata(m,n) to the second transistor T2. During the period from time t7 to time t8, the scan signal line SL_n provides the scan signal SS_n with a pulse from time t7 to time t8 to the control terminal of the second transistor T2 (i.e. the scan signal SS_n is changed from a high voltage level to a low voltage level during the period from time t7 to time t8). Thus, the node voltage V_N2 of the node N2 is set to the data voltage Vdata(m,n). The second capacitor C2 couples the voltage from the second terminal to the first terminal, so that the node voltage V_N1 of the node N1 is equal to the voltage V1 minus the absolute value of a threshold voltage |Vth|, plus the data voltage Vdata(m,n), and minus the voltage V4. The first transistor T1 is turned-on according to the node voltage V_N1, so that a driving current flows from the first terminal of the first transistor T1 to the second terminal of the first transistor T1.

Moreover, during the period from time t6 to time t10, the emission signal line EL_n provides the emission signal ES_n, and the emission signal ES_n is changed from the high voltage level to the low voltage level. Thus, the fifth transistor T5 is turned-on to provide the driving current to drive the tunable component 1010.

That is, during the emission period EP from time t9 to time t10, if IR-drop condition occurs in the first power line or the second power line, the gate-source voltage Vgs of the first transistor T1 may be maintained by an equivalent capacitance formed by the first capacitor C1 and the second capacitor C2 connected in series. Therefore, the pixel circuit 1000 may effectively improve the voltage drift of the gate-source voltage Vgs caused by IR-drop during the emission period EP. Moreover, the pixel circuit 1000 may effectively transfer the data voltage Vdata(m,n) to the control terminal of the first transistor by the second capacitor C2 without any dynamic range loss of a control voltage (i.e. the voltage of the control terminal of the first transistor T1 in the data program period PP). Furthermore, the gate-source voltage Vgs of the first transistor T1 may be set with a compensation for the threshold voltage |Vth| to improve the driving current uniformity.

Figure 12:
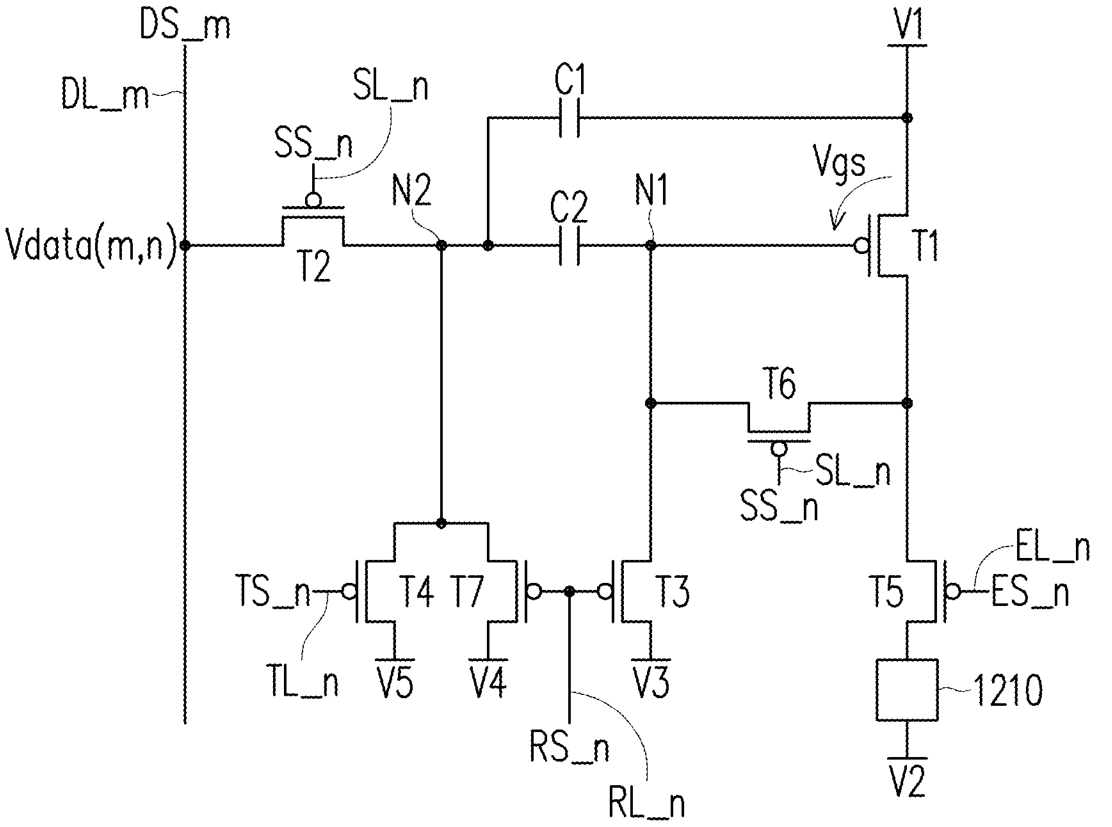
FIG. 12 is a schematic diagram of a pixel circuit according to an embodiment of the disclosure.

FIG. 12 is a schematic diagram of a pixel circuit according to an embodiment of the disclosure Referring to FIG. 12, each of the pixels P(1,1) to P(M,N) of FIG. 1 may implement a circuit architecture such as a pixel circuit 1200 of FIG. 12. In the embodiment of the disclosure, the pixel circuit 1200 includes a first transistor T1, a second transistor T2, a third transistor T3, a fourth transistor T4, a fifth transistor T5, a sixth transistor T6, a seventh transistor T7, a first capacitor C1, a second capacitor C2, and a tunable component 1210. The pixel circuit 1200 may further include a first power line, a second power line, a plurality of reset voltage lines, a reference voltage line, a data signal line DL_m, a scan signal line SL_n, a set signal line TL_n, a reset signal line RL_n, and an emission signal line EL_n. In the embodiment of the disclosure, the tunable component 1210 may be, for example, a light emitting diode or an organic light emitting diode.

In the embodiment of the disclosure, a first terminal of the first transistor T1 is coupled to the first power line and a first terminal of the capacitor C1, and receives a voltage V1 from the first power line. A second terminal of the first transistor T1 is coupled to the fifth transistor T5 and the sixth transistor T6. A control terminal of the first transistor T1 is coupled to a node N1.

A first terminal of the second transistor T2 is coupled to the data signal line DL_m, and receives a data signal DS_m from the data signal line DL_m. A second terminal of the second transistor T2 is coupled to a node N2. A control terminal of the second transistor T2 is coupled to the scan signal line SL_n, and receives a scan signal SS_n from the scan signal line SL_n.

A first terminal of the third transistor T3 is coupled to the node N1. A second terminal of the third transistor T3 is coupled to a first reset voltage line, and receives the voltage V3 from the first reset voltage line. A control terminal of the third transistor T3 is coupled to the reset signal line RL_n, and receives a reset signal RS_n from the reset signal line RL_n. In one embodiment, the first reset voltage line can be replaced by the second power line.

A first terminal of the fourth transistor T4 is coupled to node N2. A second terminal of the fourth transistor T4 is coupled to reference voltage line, and receives a voltage V5 from the reference voltage line. The reference voltage line is dedicated and electrically isolated from the first power line and the second power line. A control terminal of the fourth transistor T4 is coupled to the set signal line TL_n, and receives a set signal TS_n from the set signal line TL_n.

A first terminal of the fifth transistor T5 is coupled to the second terminal of the first transistor T1 and the sixth transistor T6. A second terminal of the fifth transistor T5 is coupled to the tunable component 1210. A control terminal of the fifth transistor T5 is coupled to the emission signal line EL_n, and receives an emission signal ES_n from the emission signal line EL_n.

A first terminal of the sixth transistor T6 is coupled to the second terminal of the first transistor T1 and the first terminal of the fifth transistor T5. A second terminal of the sixth transistor T6 is coupled to the node N1 and the first terminal of the third transistor T3. A control terminal of the sixth transistor T6 is coupled to the scan signal line SL_n, and receives a scan signal SS_n from the scan signal line SL_n.

A first terminal of the seventh transistor T7 is coupled to the second node N2. A second terminal of the seventh transistor T7 is coupled to a second reset voltage line, and receives the voltage V4 from the second reset voltage line. A control terminal of the seventh transistor T7 is coupled to the reset signal line RL_n, and receives the reset signal RS_n from the reset signal line RL_n. In one embodiment, the second reset voltage line can be replaced by the first power line.

The first terminal of the first capacitor C1 is coupled to the first terminal of the first transistor T1 and the first power line. A second terminal of the first capacitor C1 is coupled to the node N2. The first terminal of the second capacitor C2 is coupled to the node N1, and the second terminal of the second capacitor C2 is coupled to the node N2. The tunable component 1210 is coupled between the second terminal of the fifth transistor T5 and the second power line, and receives a voltage V2 from the second power line.

In the embodiment of the disclosure, the first transistor T1, the second transistor T2, the third transistor T3, the fourth transistor T4, the fifth transistor T5, the sixth transistor T6, and the seventh transistor T7 may be a plurality of p-type transistors, but the disclosure is not limited thereto. In the embodiment of the disclosure, the voltages V1, V2, V3, V4, and V5 are constant voltages. In the embodiment of the disclosure, the voltage V1 may be higher than the voltage V2, and the voltage V1 may also be higher than the voltage V3. In one embodiment of the disclosure, the voltage V2 may equal to the voltage V3, the voltage V1 may equal to the voltage V4, or the voltage V4 may equal to the voltage V5. The voltage V5 may be a reference voltage for a data voltage of the data signal DS_m. Moreover, the voltage V5 may be dedicated and electrically isolated from the voltage V1 and the voltage V2 to mitigate a luminance shift caused by the shifts of the voltage V1 and the voltage V2 (IR-drop).

Figure 13:
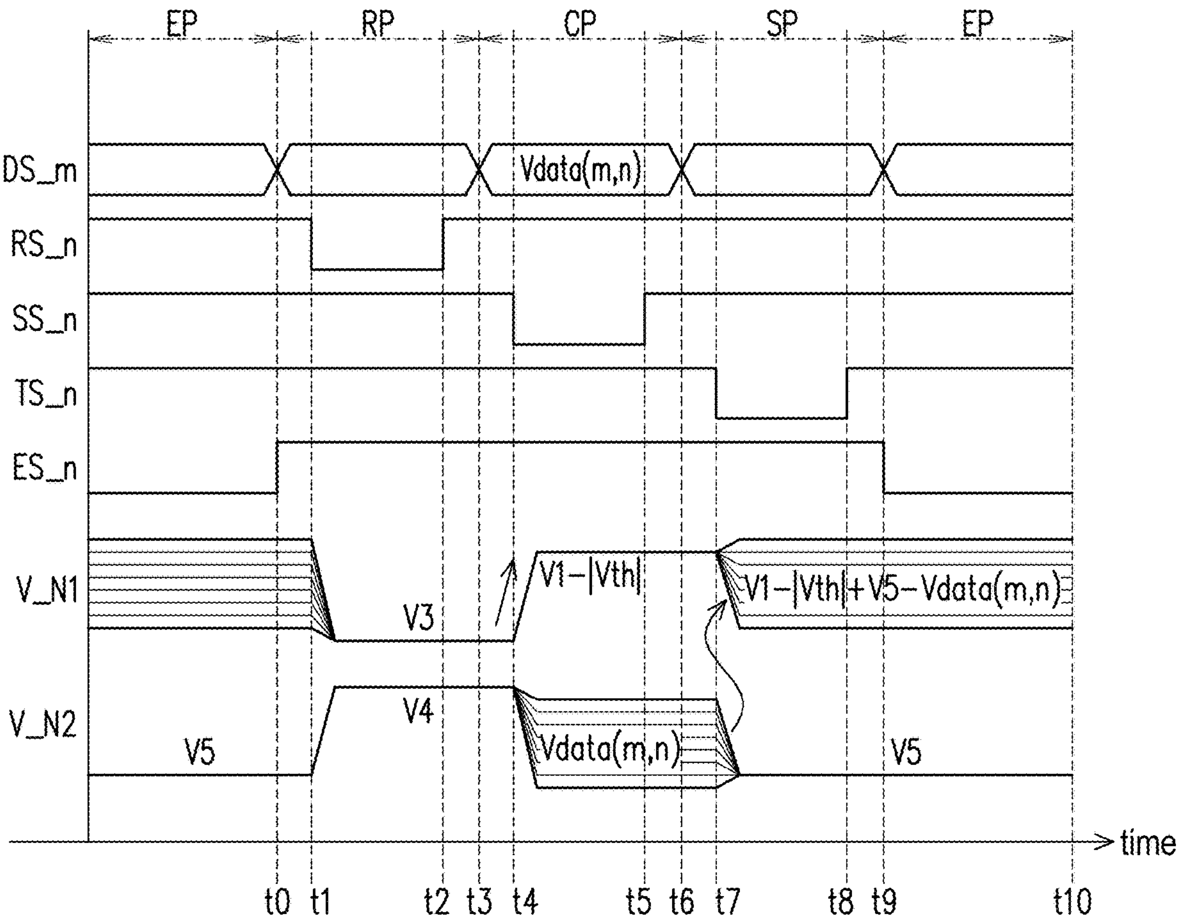
FIG. 13 is a timing diagram of relevant signals according to the embodiment of FIG. 12.

FIG. 13 is a timing diagram of relevant signals according to the embodiment of FIG. 12. Referring to FIG. 12 and FIG. 13, the pixel circuit 1200 may be operated by the relevant signals as shown in FIG. 13. In the embodiment of the disclosure, the pixel circuit 1200 may be sequentially operated in a reset period RP, a compensation period CP, a data setup period SP, and an emission period EP. During the reset period RP from time t0 to time t3, the reset signal line RL_n provides the reset signal RS_n with a pulse from time t1 to time t2 to the control terminals of the third transistor T3 and the seventh transistor T7 (i.e. the reset signal RS_n is changed from a high voltage level to a low voltage level during the period from time t1 to time t2). During the period from time t1 to time t2, the third transistor T3 and the seventh transistor T7 are turned-on, so that the third transistor T3 provides the voltage V3 to the node N1, and the seventh transistor T7 provides the voltage V4 to the node N2. Thus, a node voltage V_N1 of the node N1 is set to the voltage V3, and a node voltage V_N2 of the node N2 is set to the voltage V4.

During the compensation period CP from time t3 to time t6, the data signal line DL_m provides the data signal DS_m with a data voltage Vdata(m,n) to the second transistor T2, and the scan signal line SL_n provides the scan signal SS_n with a pulse from time t4 to time t5 to the control terminals of the second transistor T2 and the sixth transistor T6 (i.e. the scan signal SS_n is changed from a high voltage level to a low voltage level during the period from time t4 to time t5). During the period from time t4 to time t5, the second transistor T2 and the sixth transistor T6 are turned-on, so that the node voltage V_N1 of the node N1 is set to the voltage equal to the voltage V1 minus an absolute value of a threshold voltage |Vth| of the first transistor T1, and the node voltage V_N2 is set to the data voltage Vdata(m,n).

Then, during the data setup period SP from time t6 to time t9, the set signal line TL_n provides the set signal TS_n to the fourth transistor T4. During the period from time t7 to time t8, the set signal line TL_n provides the set signal TS_n with a pulse from time t7 to time t8 to the control terminal of the fourth transistor T4 (i.e. the set signal TS_n is changed from a high voltage level to a low voltage level during the period from time t7 to time t8). Thus, the node voltage V_N2 of the node N2 is set to the voltage V5. The second capacitor C2 couples the voltage from the second terminal to the first terminal, so that the node voltage V_N1 of the node N1 is equal to the voltage V1 minus the absolute value of a threshold voltage |Vth|, plus the voltage V5, and minus the data voltage Vdata(m,n). The first transistor T1 is turned-on according to the node voltage V_N1, so that a driving current flows from the first terminal of the first transistor T1 to the second terminal of the first transistor T1.

Moreover, during the period from time t9 to time t10, the emission signal line EL_n provides the emission signal ES_n, and the emission signal ES_n is changed from a high voltage level to a low voltage level. Thus, the fifth transistor T5 is turned-on to provide the driving current to drive the tunable component 1210.

That is, during the emission period EP from time t9 to time t10, if IR-drop condition occurs in the first power line or the second power line, the gate-source voltage Vgs of the first transistor T1 may be maintained by an equivalent capacitance formed by the first capacitor C1 and the second capacitor C2 connected in series. Therefore, the pixel circuit 1200 may effectively improve the voltage drift of the gate-source voltage Vgs caused by IR-drop during the emission period EP. Moreover, the pixel circuit 1200 may effectively transfer the data voltage Vdata(m,n) to the control terminal of the first transistor by the second capacitor C2 without any dynamic range loss of a control voltage (i.e. the voltage of the control terminal of the first transistor T1 in the data setup period SP). In addition, the gate-source voltage Vgs of the first transistor T1 may be set with a compensation for the threshold voltage |Vth| to improve the driving current uniformity.

In summary, according to the electronic device of the disclosure, the electronic device may effectively mitigate the luminance shift caused by the source voltage shift (IR-drop) in emission period. Moreover, in some embodiments of the disclosure, the electronic device may effectively transfer the data voltage to the control terminal of the driving transistor without any dynamic range loss of a control voltage (i.e. the voltage of the control terminal of the first transistor) in the data setup period besides eliminating control voltage error by IR-drop in the data setup period. In addition, in some embodiments of the disclosure, the electronic device may further implement the compensation of the threshold voltage of the driving transistor to improve uniformity of the driving current.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:

a first transistor, comprising a first terminal, a second terminal, and a control terminal;

a second transistor, coupled to the control terminal of the first transistor;

a first capacitor, coupled between the first terminal of the first transistor and the second transistor;

a second capacitor, coupled between the control terminal of the first transistor and the second transistor, and the first capacitor and the second capacitor are connected in series between the first terminal and the control terminal of the first transistor;

a third transistor, coupled to a first node between the second capacitor and the control terminal of the first transistor, and configured to receive a first voltage;

a fourth transistor, coupled to a second node between the second capacitor and the second transistor;

a tunable component, coupled to the second terminal of the first transistor;

a fifth transistor, coupled between the first transistor and the tunable component;

a sixth transistor, coupled between the second terminal of the first transistor and the first node; and an emission signal line, coupled to a control terminal of the fourth transistor and a control terminal of the fifth transistor, wherein one of the fourth transistor or the fifth transistor is a p-type transistor, and another one of the fourth transistor or the fifth transistor is an n-type transistor.

2. The electronic device according to claim 1, further comprising:

a first power line, coupled to the first transistor; and a second power line, coupled to the tunable component.

3. The electronic device according to claim 2, further comprising:

a reference voltage line, coupled to the fourth transistor, and configured to provide a reference voltage to the second node, wherein the reference voltage line is dedicated and electrically isolated from the first power line and the second power line.

4. The electronic device according to claim 2, wherein the third transistor is further coupled to the first power line.

5. The electronic device according to claim 2, wherein the third transistor is further coupled to the second power line.

6. The electronic device according to claim 2, wherein when the electronic device is operated in a first period, the second node is set to a second voltage with a reference voltage line.

7. The electronic device according to claim 1, further comprising:

a data signal line, coupled to a first terminal of the second transistor; and a scan signal line, coupled to a control terminal of the second transistor, wherein the second node is coupled to a second terminal of the second transistor.

8. The electronic device according to claim 7, wherein during a first period, the data signal line provides a data voltage to the first terminal of the second transistor, and the scan signal line provides a first pulse to the control terminal of the second transistor, so that the second node is set to the data voltage.

9. The electronic device according to claim 1, wherein when the electronic device is operated in a first period, the first node is set to the first voltage, the second node is set to a second voltage with different voltage sources, respectively.

10. The electronic device according to claim 9, wherein the first voltage is higher than the second voltage when the first transistor is an n-type transistor and the first voltage is lower than the second voltage when the first transistor is a p-type transistor.

11. The electronic device according to claim 9, wherein the first voltage and the second voltage are constant voltages.

* * * * *